(12) United States Patent
Nickerson et al.

(10) Patent No.: US 7,523,158 B1
(45) Date of Patent: Apr. 21, 2009

(54) SYSTEM AND METHOD FOR PARTIAL PAGE UPDATES USING A PROXY ELEMENT

(75) Inventors: Thomas W. Nickerson, Belmont, CA (US); Blake Sullivan, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 752 days.

(21) Appl. No.: 10/246,661

(22) Filed: Sep. 18, 2002

Related U.S. Application Data

(63) Continuation-in-part of application No. 09/570,276, filed on May 12, 2000.

(51) Int. Cl.
*G06F 15/16* (2006.01)

(52) U.S. Cl. ............... 709/203; 717/168; 717/170; 717/171; 711/122; 711/206; 709/204; 709/216; 709/226; 709/240

(58) Field of Classification Search ........... 709/203, 709/204, 218, 226, 240, 216; 717/168, 170, 717/171; 711/122, 206
See application file for complete search history.

(56) References Cited

U.S. PATENT DOCUMENTS

| 5,727,164 | A |   | 3/1998 | Kaye et al. |
|---|---|---|---|---|
| 5,870,544 | A | * | 2/1999 | Curtis .................. 726/14 |
| 5,873,069 | A | * | 2/1999 | Reuhl et al. ............ 705/20 |
| 5,894,554 | A |   | 4/1999 | Lowery et al. |
| 5,945,989 | A |   | 8/1999 | Freishtat et al. |
| 6,003,046 | A | * | 12/1999 | Nielsen .................. 715/513 |
| 6,105,004 | A |   | 8/2000 | Halperin et al. |
| 6,226,642 | B1 |   | 5/2001 | Beranek et al. |
| 6,249,844 | B1 | * | 6/2001 | Schloss et al. .......... 711/122 |
| 6,263,352 | B1 |   | 7/2001 | Cohen |
| 6,266,684 | B1 |   | 7/2001 | Kraus et al. |
| 6,308,247 | B1 | * | 10/2001 | Ackerman et al. ...... 711/206 |
| 6,308,275 | B1 |   | 10/2001 | Vaswani et al. |
| 6,415,319 | B1 |   | 7/2002 | Ambroziak |
| 6,415,335 | B1 | * | 7/2002 | Lowery et al. .......... 710/5 |
| 6,434,578 | B1 |   | 8/2002 | McCauley et al. |
| 6,438,578 | B1 | * | 8/2002 | Schmid et al. .......... 709/203 |
| 6,457,030 | B1 |   | 9/2002 | Adams et al. |
| 6,493,679 | B1 |   | 12/2002 | Rappaport et al. |
| 6,535,896 | B2 |   | 3/2003 | Britton et al. |
| 6,594,691 | B1 | * | 7/2003 | McCollum et al. ...... 709/218 |
| 6,601,057 | B1 |   | 7/2003 | Underwood et al. |
| 6,626,958 | B1 |   | 9/2003 | McCauley et al. |
| 6,668,354 | B1 |   | 12/2003 | Chen et al. |
| 6,701,368 | B1 | * | 3/2004 | Chennapragada et al. ... 709/228 |

(Continued)

OTHER PUBLICATIONS

Remote Scripting, "http://msdn.microsoft.com/scripting/remotescripting . . . " Microsoft Corporation (Jan. 4, 2000).

*Primary Examiner*—John Follansbee
*Assistant Examiner*—Saket K Daftuar
(74) *Attorney, Agent, or Firm*—Chapin IP Law, LLC; Barry W. Chapin, Esq.

(57) ABSTRACT

A system and method for updating page content of a web page includes applying a partial page update from a content server to the page content through a proxy content element. This avoids having to reload the entire page content every time a change to content is required; thus eliminating screen flash within the browser, which generally accompanies navigating between similar pages from the same web site.

32 Claims, 14 Drawing Sheets

U.S. PATENT DOCUMENTS 6,757,708 B1 * 6/2004 Craig et al. ................. 709/203
6,760,750 B1 * 7/2004 Boneh et al. ................ 709/204
6,775,743 B2 * 8/2004 Patel ......................... 711/118
6,854,018 B1 * 2/2005 Li et al. ...................... 709/240
6,996,616 B1 * 2/2006 Leighton et al. ............ 709/226
7,069,497 B1 * 6/2006 Desai ...................... 715/501.1

* cited by examiner

```
<html>
<head>
<script src="blockReplace.js">                517
</head>
<body>
<iframe name="blockReplaceCommunication"></iframe>        520

<form name="autoChoiceForm">

<select name="makes" onchange="firePartialChange('models')">
<option label="Ford" value="ford" selected></option>
<option label="Chrysler" value="chrysler"></option>
...more makes....
</select>

<select name="models" id="models">
<option label="Taurus" value="Taurus" selected></option>
...more Ford models....
</select>

<select
</form>
</body>
</html>
```

FIG. 6B

```
<html>
<body onload="replaceContent()">           ⌐ 550
<select name="models" id="models">
    <option label="300M" value="300M" selected></option>  ⎫ 545
    ...more Chrysler models....                           ⎭
</select>
<script>                    ⌐ 540
    var _ids=["models"];
</script>
</body>
</html>
```

FIG. 6C

SYSTEM AND METHOD FOR PARTIAL PAGE UPDATES USING A PROXY ELEMENT

RELATED APPLICATION(S)

This application is a continuation-in-part of U.S. application Ser. No. 09/570,276, entitled "Content Update Proxy Method" and filed May 12, 2000. The entire teachings of the above application are incorporated herein by reference.

BACKGROUND

The Internet includes a vast collection of web sites offering information, entertainment, and e-commerce services. Each web site is a compilation of interrelated web pages that are served upon request to client computer systems executing web browsing software applications, such as web browsers. Web browsers can be utilized by Internet users to view these web pages.

A web page typically includes a main document encoded in a markup language, such as HTML or XML, and may also include instructions from a scripting language, such as JavaScript. The main document may require associated files for graphics, audio, video, and scripts. Script files may be encoded in a markup language and may also include instructions from a scripting language. The main web page document and its associated files describe how a web browser should display the page content and handle events occurring therein.

A web page is requested from a web browser by its URL (Universal Resource Locator). A URL is an address identifying the location of a resource, such as the main web page document or any of the associated files. The requested document or file is subsequently retrieved and transmitted back to the requesting browser. Some requested documents, such as Active Server Pages, require additional processing by the web server prior to transmission. This processing may include executing server-side scripting instructions for generating a customized web page document or script file.

After the main web page document is transmitted, the web browser loads the document into its display window. During the loading process, the browser issues further requests to the web server whenever the received document references an associated file by its URL. The result is multimedia content being displayed through the browser window providing information, entertainment, or e-commerce services.

SUMMARY

A problem inherent with current web browsers involves how web pages are loaded. In general, whenever a user navigates from one web page to another, the content previously displayed is cleared, such that the browser window or frame within the browser displays an empty background. Once the new page is loaded from the server, the empty background is replaced with the new content described by the web page. This may be acceptable when the user is navigating between two different web sites. But even when subsequent web pages requested from the same web site are not substantially different, the entire web page content is still downloaded from the web server for display to the user. This results in unnecessary network traffic and, at the browser, the browser window appears to flash, which may annoy the user. Furthermore, scroll position and previously entered data may be lost when updating page content. This is a problem particularly for long web pages. What is needed is a more seamless approach to updating browser windows.

One method involves the embedding of a Java applet within a web page to communicate content changes between a web server and the window or frame in which it is located. Java applets are programs written in the Java programming language that can be executed by a web browser. However, there are several limitations to this technology that raise concern about the viability of Java applets as a solution.

First, there is concern about network security, especially unauthorized access to a computer system, when Java applets are allowed to execute. Some Information Technology managers refuse to allow Java through their network firewalls, which guard against external threats from other networks, such as hackers. OCX and ActiveX controls exhibit the same security concerns.

Another issue regarding Java applets is related to the Java virtual machine, which is required to execute Java applets and is installed in the client computer. The Java virtual machine may be replaced with another version installed separately by a user or as part of another application installation. This installed version may not be compatible with the code of the Java applet preventing the applet from functioning properly.

Furthermore, even if the Java virtual machine is the correct version, the user must wait for it to initiate before executing any Java applet code. Therefore, the use of Java applets have an inherent latency particularly when utilized on slow computers.

Embodiments of the invention include a system and method for updating page content of a web page while reducing latency. Such embodiments can include a browser which applies partial page updates from a content server to the page content through a proxy content element. In particular, a content server communicates data for the partial page update to the proxy content element and then the browser applies the data from the proxy content element to the page content, resulting in a portion of the page content being updated.

According to one embodiment, the browser can send a request to the content server, in which the request includes at least one parameter used by the content server to generate the data for the partial page update. The data for the partial page update may includes a set of executable instructions that the browser executes from the proxy content element to modify a portion of the page content.

According to another embodiment, the browser can send a request to the content server, in which the request includes at least one parameter that identifies a content element in the page content. Such parameters may be utilized by the content server to generate the data for the partial page update. The data for the partial page update may include one or more content elements to replace existing content or to be inserted into the page content using existing content as a reference point.

BRIEF DESCRIPTION OF THE DRAWINGS

The foregoing and other objects, features and advantages of the invention will be apparent from the following more particular description of embodiments of the invention, as illustrated in the accompanying drawings in which like reference characters refer to the same parts throughout the different views. The drawings are not necessarily to scale, emphasis instead being placed upon illustrating the principles of the invention.

FIG. 6B is a diagram containing an example of pseudo code for the page content of FIG. 6A implementing block replacement according to one embodiment.

FIG. 6C is a diagram containing an example of pseudo code representing content data utilized in block replacement according to one embodiment.

DETAILED DESCRIPTION

Particular embodiments of the invention utilize a content element as a proxy between a content server and page content within a browser to facilitate partial updates of the page content. According to such embodiments, the proxy element may submit a request for a partial page update to a server, which in turn communicates data for the page update back to the proxy element. The data for the partial page update may be in the form of a set of executable instructions for modifying existing content or new content for insertion or replacement of existing content. The browser applies the data contained within the proxy element to the page content, resulting in a portion of the content being updated. The proxy element may be of any element type that is capable of containing instructions or content data, such as an IFrame or Layer element in HTML.

Such embodiments enhance the overall performance and experience of content browsing. For example, by updating only portions of page content, performance speed is increased and page flash is reduced, because the page content does not need to be completely re-rendered for small updates. Likewise, because only portions of page content are updated, less data is required to effectuate a partial update to page content and, thus, requires less network bandwidth to transmit such data. Reductions in bandwidth requirements are particularly useful when page content is generated from a large amount of code. Further, scroll position and data may be maintained because only portions of the page content are rendered, not the entire page.

Figure 1:
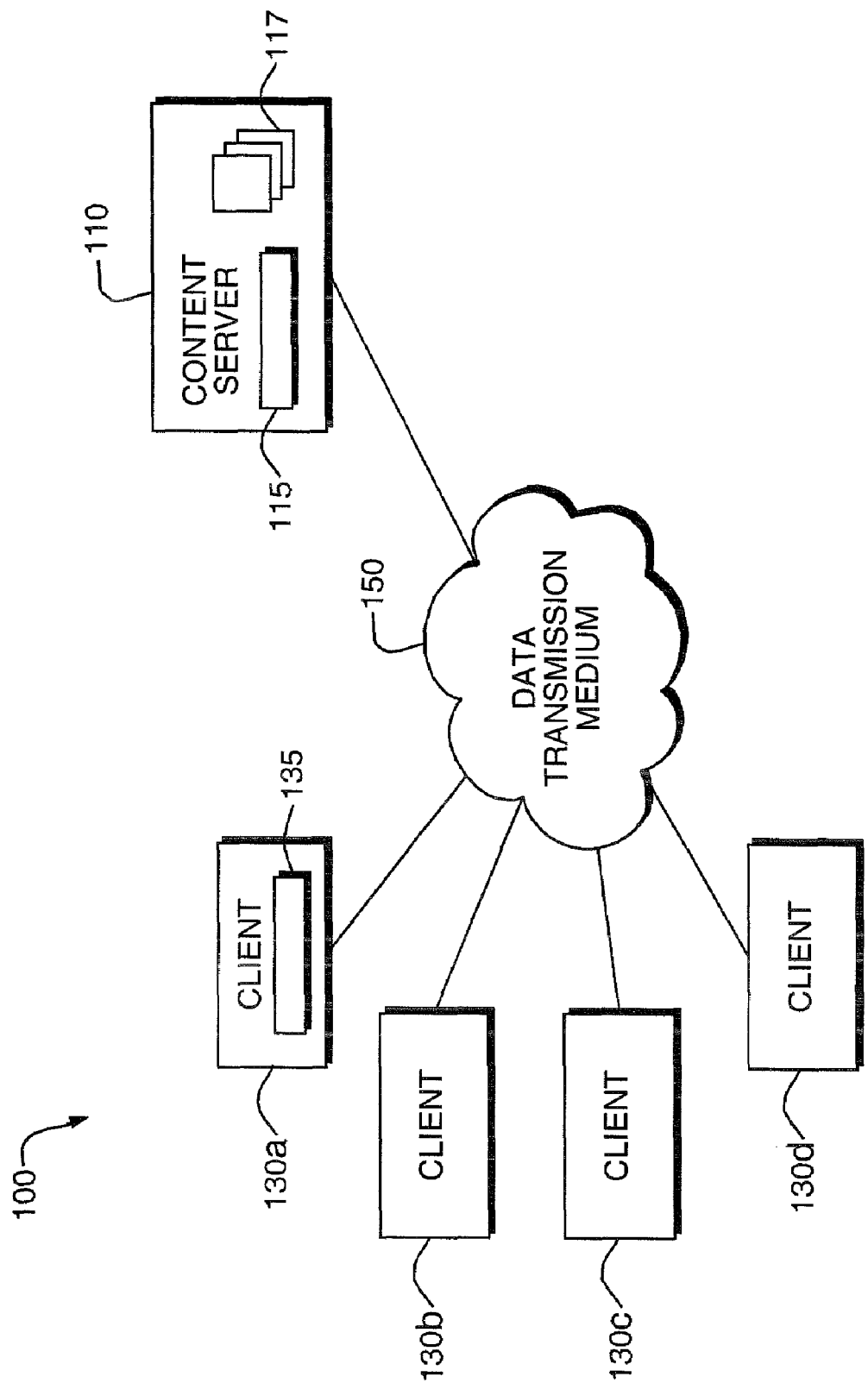
FIG. 1 illustrates a client-server data communication network in which particular embodiments of the present invention may be employed.

FIG. 1 illustrates a client-server data communication network in which particular embodiments of the present invention may be employed. As shown, a client-server network 100 includes a content server 110, providing content upon request to a number of clients, collectively 130. The content server 110 may provide a variety of content 117 in the form of text, graphics, audio and video. A data transmission media 150 provides an infrastructure for communicating client requests for content to the server 110 and server transmissions of content to the clients 130.

According to one embodiment, the content server 110 is a web server, including a web server process 115 for managing the transmission of content 117 in response to client requests. The clients 130 include a web browser process 135 for viewing page content from the web server 110. The clients 130 may transmit requests for page content to the web server 110 over the Internet 150 using application level protocols known to those skilled in the art, such as HTTP (Hypertext Transfer Protocol). Particular mechanisms for transmitting client requests may include HTTP POST or GET methods and SOAP messaging. Other mechanisms known to those skilled in the art may also be implemented.

For information regarding SOAP messaging, refer to "SOAP Version 1.2 Part 0: Primer," Copyright © 2001 W3C® (Massachusetts Institute of Technology ("MIT"), Institute National de Recherche en Informatique et en Automatique ("INRIA"), Keio University ("Keio")); "SOAP Version 1.2 Part 1: Messaging Framework," Copyright © 2001 W3C® (MIT, INRIA, Keio); and "SOAP Version 1.2 Part 2: Adjuncts," Copyright © 2001 W3C® (MIT, INRIA, Keio); the entire contents of which are incorporated herein by reference.

Figure 2A:
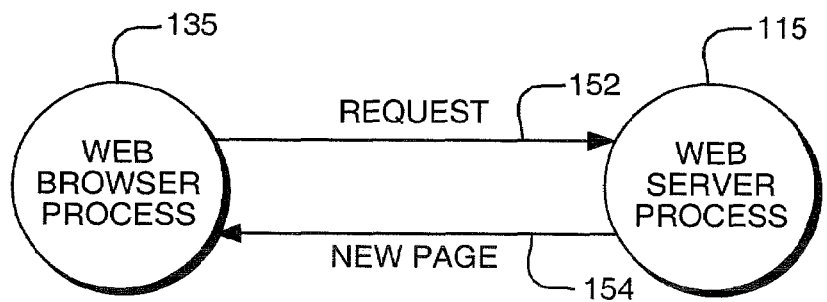
FIG. 2A illustrates high level communications between a web browser process and a web server process known in the art.

FIG. 2A illustrates high level communications between a web browser process and a web server process known in the art. Whenever an event occurs that requires an update to page content from the server 110, the web browser process 135 transmits a request 152 for the desired page content to the web server process 115. The request 152 typically includes an address for the desired page content, referred to as a Universal Resource Locator (URL). The request may also include input parameters for generating a customized page response. Input parameters are typically formatted as a string of field-value pairs appended to the URL, referred to as a query string.

In response to every page request, the web server process 115 generates and transmits a new page 154. Such communication of page content results in inefficient usage of network bandwidth and slower browser performance, which results from having to transmit and reload a full page of content each time a partial page update is requested.

Furthermore, the transition from the previous page state to the new page state produces a flash from the user interface of the web browser process 135. During the transition, the previous page content is cleared resulting in the momentary display of an empty background until the new page content is loaded. Thus, the user interface of the browser process 135 appears to flash, disrupting the continuity of subsequently displayed web pages.

Figure 2B:
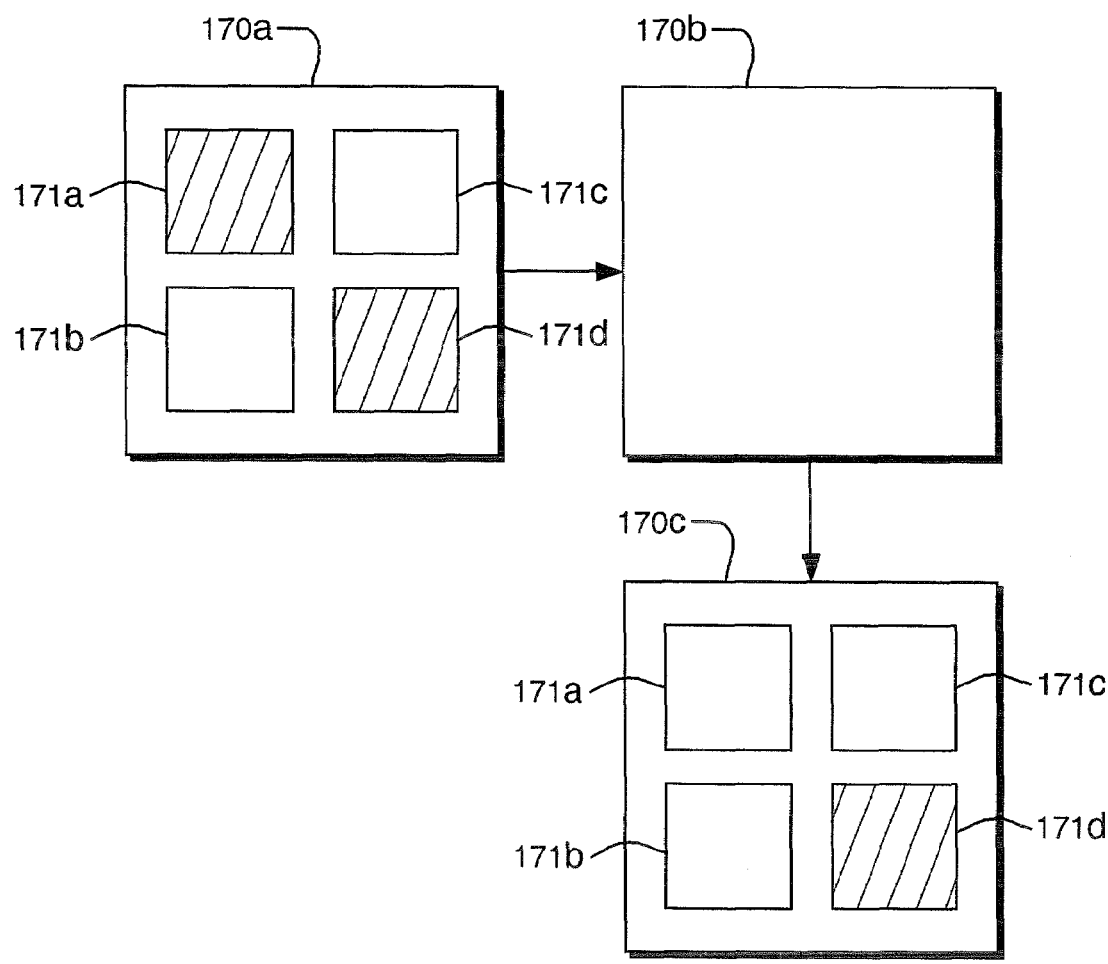
FIG. 2B illustrates a page flash that is produced during a transition from previous page content to new page content inherent in the prior art.

FIG. 2B illustrates a page flash that is produced during a transition from previous page content to new page content inherent in the prior art. The previous page state 170a of a web page is shown having four content elements, collectively 171, which may be of any multimedia type. An event may be triggered in the web page, resulting in a page request being sent to the web server process 115. The web server process 115, in turn, transmits a new page to the web browser process 135 for display.

Prior to loading the new page content into the browser, the previous page content is erased from memory, resulting in a transitional page state 170b having the previous page content being cleared from the user interface. This transitional page state 170b results in the display of the empty background, causing the web page to appear to flash. Furthermore, scroll position and previously entered data may be lost.

After loading the new page content, the new page state 170c includes the display of the new page content, in which the changes from the previous page state 170a may affect less than the entire page. For example, in FIG. 2B the new page state 170c differs from the previous page state 170a only with respect to element 171a.

Figure 3A:
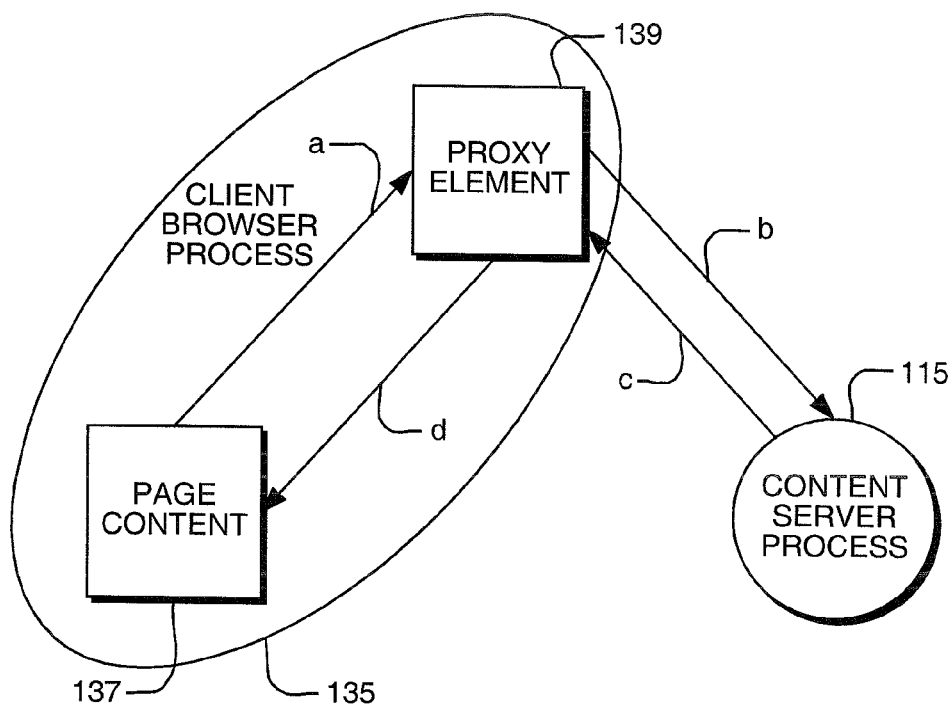
FIG. 3A is a high level diagram illustrating a method for applying a partial page update using a proxy element according to one embodiment.

FIG. 3A is a high level diagram illustrating a method for applying a partial page update using a proxy element according to one embodiment. The browser process 135 loads page content 137 containing a proxy content element 139 for presentation through a user interface. In response to an event requiring a partial update, the proxy element 139 is accessed via a message $M_a$ from within page content 137. The proxy element 139, in turn, submits a request for a partial page update to the content server process 115 via a message $M_b$. The content server process 115 generates and transmits data for the page update back to the proxy content element 139 via a message $M_c$. The browser 135 then applies the data from the proxy content element 139, resulting in a portion of the page content being updated according to data in a message $M_d$.

According to one embodiment, the proxy element 185 may be an inline frame ("IFrame") element. An IFrame element is a construct, which embeds a sub-document into a web page. The IFrame element is supported in Microsoft® Internet Explorer versions 5.0 and greater, which support HTML 4.0. The SRC attribute of the IFrame element is used to reference a separate document that contains the content of the IFrame. For more information regarding the IFrame element, refer to "16.5 Inline frames: the IFRAME element," HTML 4.01 Specification W3C Recommendation 24 Dec. 1999, the entire contents of which are incorporated herein by reference.

According to an alternative embodiment, the proxy element 185 may be a Layer element. Layer elements, which are supported in Netscape® Navigator versions 4.0 and greater, allow discrete layers of documents to be positioned in or outside the user interface of a browser process. The SRC attribute of the Layer element is used to reference a separate document that contains the content of the Layer. For more information regarding, the Layer element, refer to "Positioning Content," HTML Tag Reference, (Netscape Corporation, Jan. 26, 1998), the entire contents of which are incorporated herein by reference.

Figure 3B:
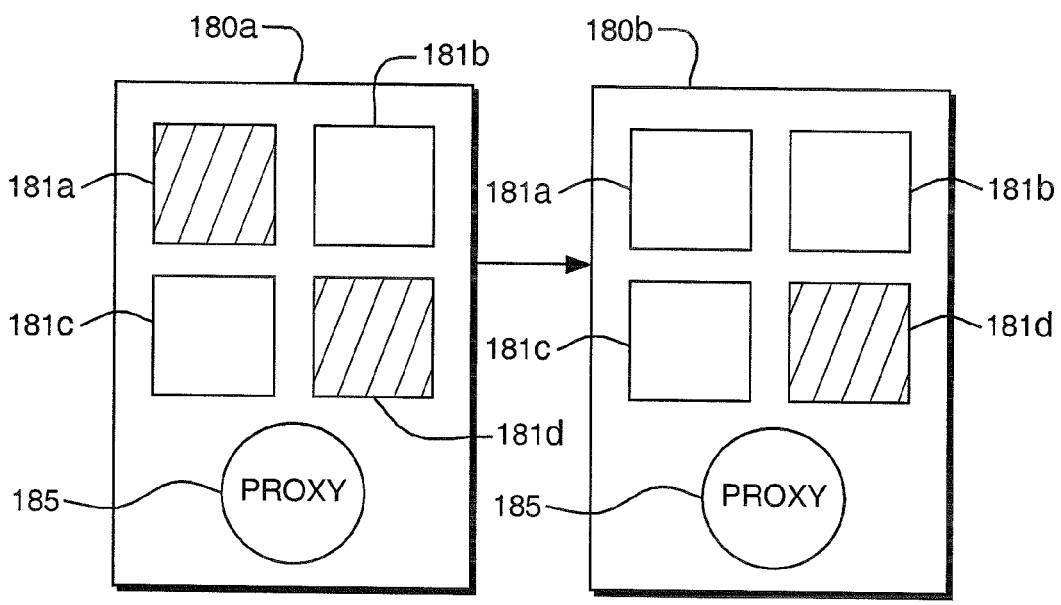
FIG. 3B illustrates a transition from previous page content to update page content without page flash according to one embodiment.

FIG. 3B illustrates a transition from previous page content to update page content without page flash according to one embodiment. The previous page content 180a of a web page is shown having four content elements, collectively 181, which may be of any multimedia type. The page content 180a also includes a proxy content element 185 that serves as a proxy for communicating data for a partial page update from a content server to page content 181. The page content 180a may also include a library 187 containing common functions for applying a partial page update. With library 187, the data for the partial page update may be further simplified by including calls to functions in the library 187.

Because the proxy element 185 may be hidden from view, there is no user visible intermediate page state between the previous and current page states 180a, 180b. As a result, content elements, such as 181a in the previous page state, may be modified or replaced with new content elements, such as element 181a' in the current page state without having to reload the entire page content. New content elements may also be inserted in the page content using at least one of the content elements 181 as a reference point for the insertion.

Figure 4:
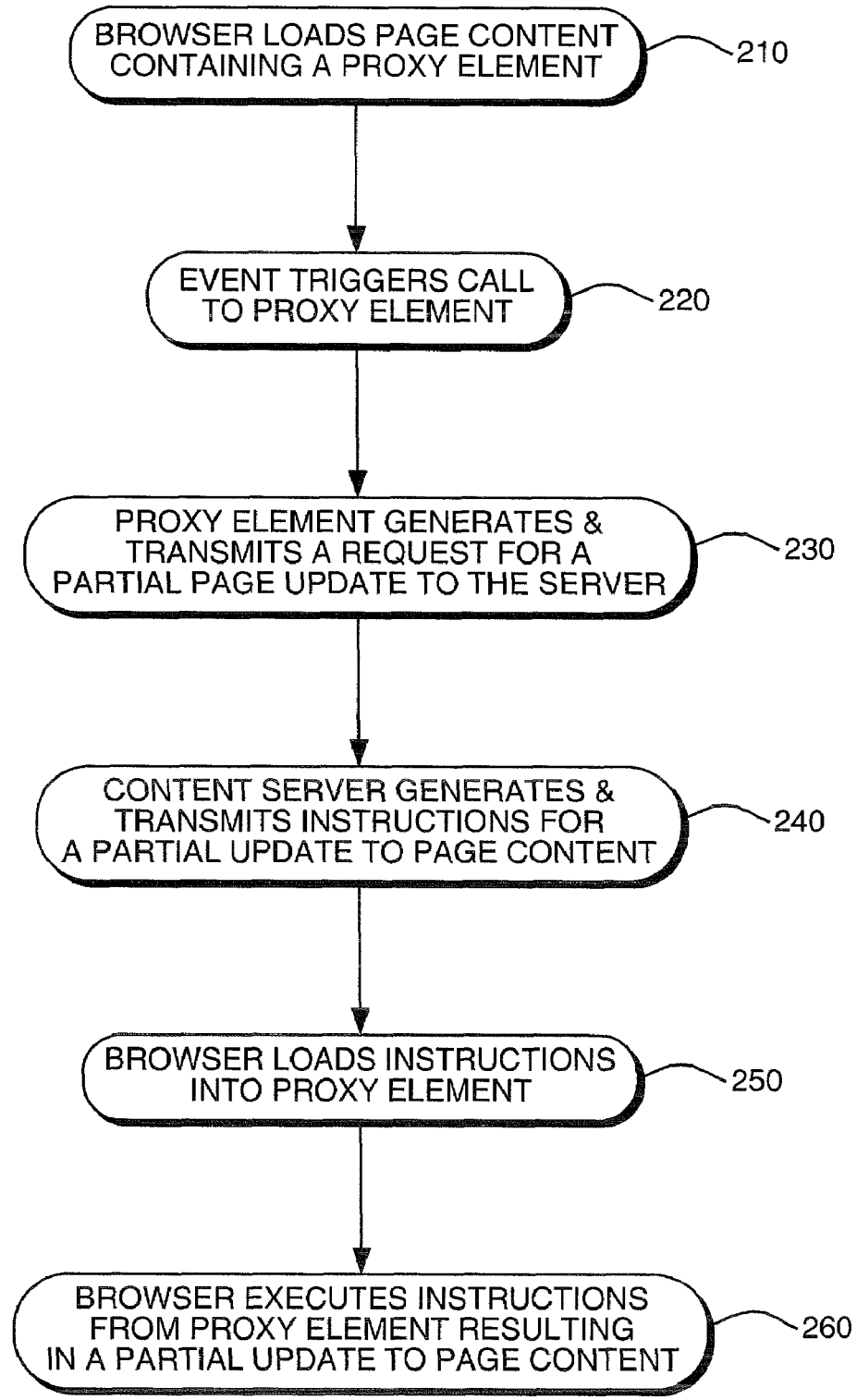
FIG. 4 is a flow chart illustrating a process for partial page update according to one embodiment.

FIG. 4 is a flow chart illustrating a process for partial page update according to one embodiment.

At 210, the browser process 135 loads page content 137 containing a proxy element 139 from a content server process 115. According to one embodiment, the proxy element 139 may define a method, referred to as a "proxy method," that may be called from an event handler defined within the page content 137. Specific embodiments of the proxy method are disclosed in U.S. application Ser. No. 09/570,276, the entire contents of which are incorporated herein by reference. The proxy element 139 may be hidden from view, while the page content 137 may include a number of content elements, such as HTML elements.

At 220, an event triggers a call to the proxy element 139, invoking the proxy element 139 to request a partial page update from the server process 115. According to one embodiment, an event handler defined within the page content 137 invokes the proxy method defined within the proxy element. The proxy method may be invoked with input parameters that may be used to generate the request for the partial page update.

At 230, the proxy element generates and transmits a request for the partial page update to the server process 115 via the browser process 135. The request may include any number of parameters that may be used by the content server in generating the data for the partial page update. According to one embodiment, the request is generated in the form of a query string appended to a URL. Alternative mechanisms for transmitting the request known to those skilled in the art may also include SOAP messaging and HTTP POST or GET methods.

At 240, in response to the request, the server process 115 generates and transmits data for the partial page update of page content. According to one embodiment, the data may be in the form of a set of executable instructions for modifying existing content. At 250, the browser process 135 loads the instructions into the proxy element 139.

At 260, the instructions are executed from the proxy element 139, resulting in a partial page update to page content 137. According to one embodiment, the instructions may directly modify page content, such as changing properties of certain content elements and spawning new browser windows. Alternatively, the instructions may invoke other functions, which are accessible, for example, through a library embedded in the page content or a source frame, as described in U.S. application Ser. No. 09/570,276, the entire contents of which are incorporated by herein reference.

Figure 5:
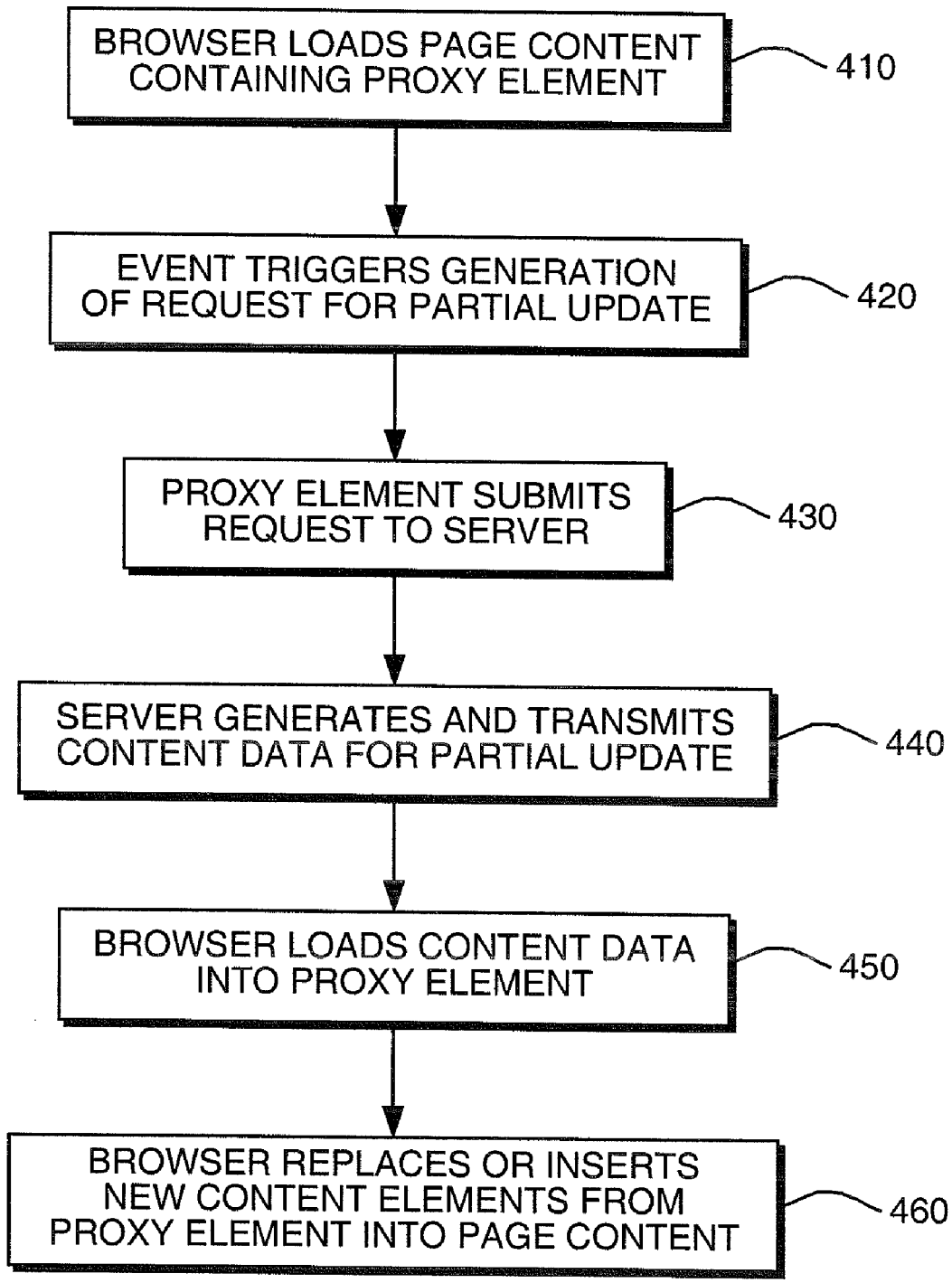
FIG. 5 is a flow chart illustrating a process of partial page update according to an alternative embodiment.

FIG. 5 is a flow chart illustrating a process of partial page update according to an alternative embodiment. Such embodiments are referred to herein as block replacement or block insertion, depending on the specified operation.

At 410, the browser process 135 loads page content 137 containing a proxy element 139 from a content server process 115. Each content element within the page content 137 may be tagged with a content identifier. For example, in HTML, a content element may be tagged with an ID attribute (e.g., ID="button1"). Other attributes or properties known to those skilled in the art may be utilized to uniquely identify a content element within page content.

At 420, an event triggers the generation of a request for a partial page update. The request may include a number of parameters that may be used by the content server process 115 to generate the response for the partial page update. According to one embodiment, each parameter specifies a content identifier associated with current content that should either be replaced with new content or serve as a reference point for insertion of new content.

At 430, the proxy element submits the request to the server process 115.

At 440, in response to the request, the content server process 115 generates and transmits content data for the partial update to the proxy element 139. According to one embodiment, the content server generates an HTML response document with the content data including (i) a list of content identifiers; (ii) generated content for each content identifier; (iii) an indication of whether the new content should replace current content or be inserted before or after current content; and (iv) an onLoad event handler that initiates the block replacement or block insertion of the new content.

At 450, the browser process 135 loads the content data into the proxy element 139.

At 460, the browser process 135 replaces or inserts the new content from the proxy element 139 into the page content 137. According to one embodiment, the generated content provided by the server is tagged with content identifiers that match the content identifiers of content elements in the page content. Once initiated, the browser process 135 iterates through the list of content identifiers locating a new content element from the proxy element 139 and a current content element from the page content 137 that are both tagged with the same identifier. Once located, the browser process executes either a replacement or an insertion of the new content into the page content 137. For a replacement operation, the current content element in the page content 137 is replaced with the new content element from the proxy element 139. For a prepend insertion operation, the new content element is inserted into the page content 137 before the current content element. For an append insertion operation, the new content element is inserted into the page content 137 after the current content element. As a result, the browser process 135 redraws the affected portions of the page, completing the partial page update of the page content 137.

Figure 6A:
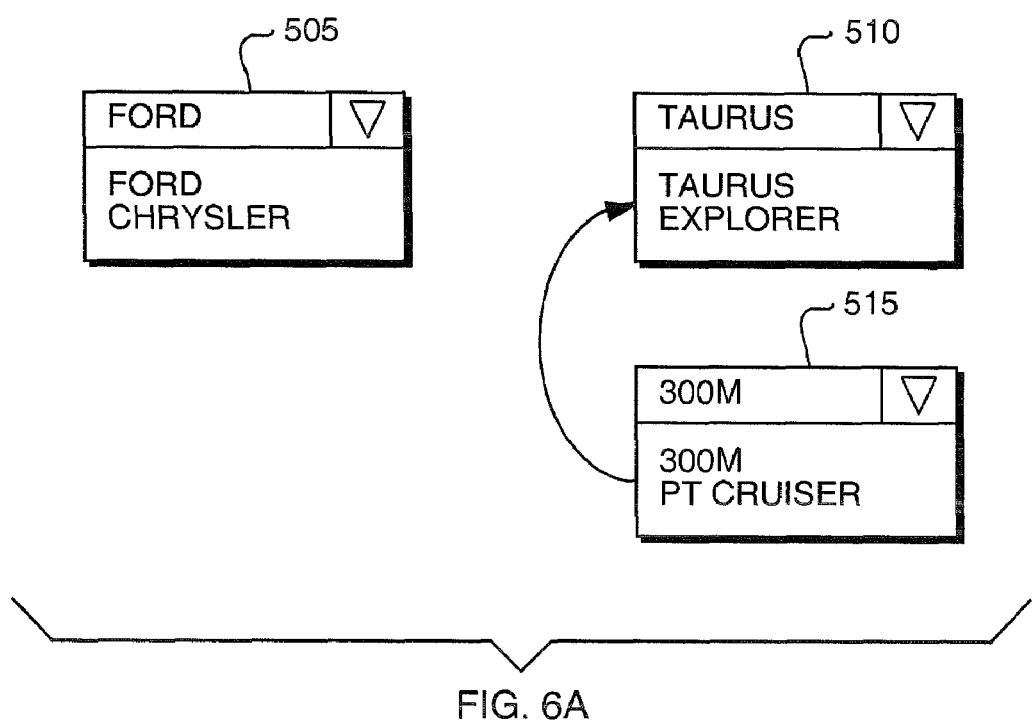
FIG. 6A is a pictorial representation of page content implementing block replacement according to one embodiment.

FIGS. 6A-6C are diagrams illustrating an example of block replacement according to one embodiment. FIG. 6A is a pictorial representation of page content implementing block replacement according to one embodiment. In this example, the page content displays two simple choice controls 505, 510. Choice control 505 provides a selectable list of different automotive makes, while control 510 provides a list of models corresponding to the selected make. As the user changes the selected make of control 505, choice control 510 is replaced with a new choice control 515 with an updated list of corresponding models.

FIG. 6B is a diagram containing an example of pseudo code for the page content of FIG. 6A implementing block replacement according to one embodiment. The proxy content element is implemented as an IFrame element at 520. The page content is implemented as a form 525 with two content elements (i.e., choice controls "makes" and "models") at 530 and 535 respectively. As shown, the "models" choice control at 535 is tagged with a content identifier (i.e., id="models").

Whenever the user changes the selected make of choice control 505, the onChange event handler "firePartialChange" at 530 is executed, generating the request for the partial update and submitting the request to the server by the IFrame proxy element. In this example, the content identifier "models" is passed as a parameter to the firePartialChange event handler to be included with the request. According to one embodiment, the firePartialChange( ) function may be implemented according to the following pseudo code:

(1) Add a hidden field with a special name, such as "partialIDs" to the form with a value consisting of the list of identifiers (e.g., "models") to be block-updated;
(2) Save the current target frame for the HTML form element;
(3) Set the current target frame of the HTML form element to point to the IFrame used for block replacement (i.e., "blockReplaceCommunication");
(4) Submit the form to the server (NOTE: since the form's target is currently the IFrame used for block replacement, the IFrame initiates the communication to the server and receives the response from the server);
(5) Set the target of the form back to the target saved at (2); and
(6) Remove the hidden field added at (1).

Assuming that the user changes the choice from "Ford" to "Chrysler," the form would be submitted, indicating that the currently selected choice value is "chrysler" and that only the "models" choice control 510 should be updated. At the content server, the presence of the specially named form field, which is added in step (1) of the "firePartialChange" function above, directs the server to generate an HTML response document that updates only a portion of the page content.

For example, FIG. 6C is a diagram containing an example of pseudo code representing content data utilized in block replacement according to one embodiment. The list of content identifiers is implemented as a JavaScript variable containing an array of content identifiers at 540. At 545, the generated content is shown as a new choice control having the same content identifier "models" as the current content in FIG. 6B. The on Load handler is implemented as a JavaScript function "replaceContent( )" at 550, which is defined in the library, "blockReplace.js" at 517 of FIG. 6B.

According to one embodiment, the onLoad handler "replaceContent( )" iterates through all of the content identifiers listed in the content data and calls a library function, referred to as partialChange( ), that implements block replacement and/or block insertion. The partialChange( ) function may be implemented using the Document Object Management (DOM). DOM is a platform- and language-neutral interface that allows programs and scripts to dynamically access and update the content, structure and style of documents. The document can be further processed and the results of that processing can be incorporated back into the presented page. For more information regarding DOM, refer to "Document Object Management (DOM)," Jun. 17, 2002, maintained by the W3C DOM WG.

In response to the calling partialChange( ), the browser redraws the affected portions of the page and the block replacement is now complete. For example, in FIG. 6C, the IFrame document defines a new content element at 545 as follows:

<select name="models" id="models">

<option label="300M" value="300M" selected></option>

Likewise, in FIG. 6B, the page content document defines an existing content element at 535 as follows:

<select name="models" id="models">

<option label="Taurus" value="Taurus" selected></option>

With block replacement, the definition of the existing content element at 535 of FIG. 6B is replaced with the definition of the new content element 545 of FIG. 6C. The result is that choice control 510 displaying Ford models is replaced with choice control 515 displaying Chrysler models, as illustrated in FIG. 6A.

Figure 7:
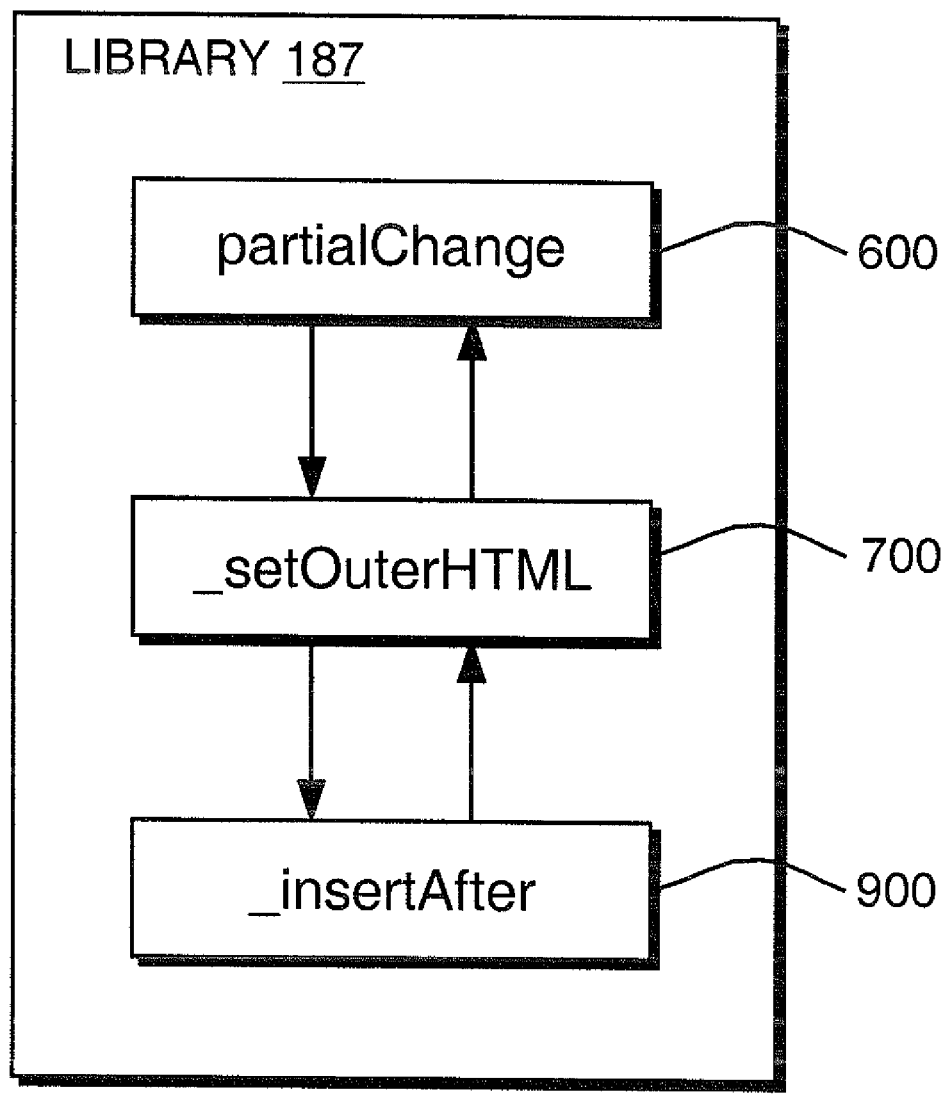
FIG. 7 provides a high level flow diagram of functions that implement block replacement and block insertion according to one embodiment.

FIG. 7 provides a high level flow diagram of functions that implement block replacement and block insertion according to one embodiment. Such functions may be stored in a library 187 that is embedded in page content. According to this embodiment, function 600, referred to as partialChange( ), locates the target and source content elements in the page content and the proxy element, respectively, that correspond to a specified content identifier. After determining the operation to perform on these elements (i.e., replace, append, prepend), the partialChange( ) function 600 calls function 700, referred to as _setOuterHTML( ), to perform block replacement or insertion of content elements. According to one embodiment, the _setOuterHTML( ) function 700 tailors the block replacement and insertion process depending on the type of browser employed (i.e., Microsoft Internet Explorer, Netscape Navigator, etc.) and the types of elements being inserted or replaced. When the operation is an append operation, the _setOuterHTML( ) function 700 further calls function 900, referred to as _insertAfter( ), to perform the insertion.

Figure 8:
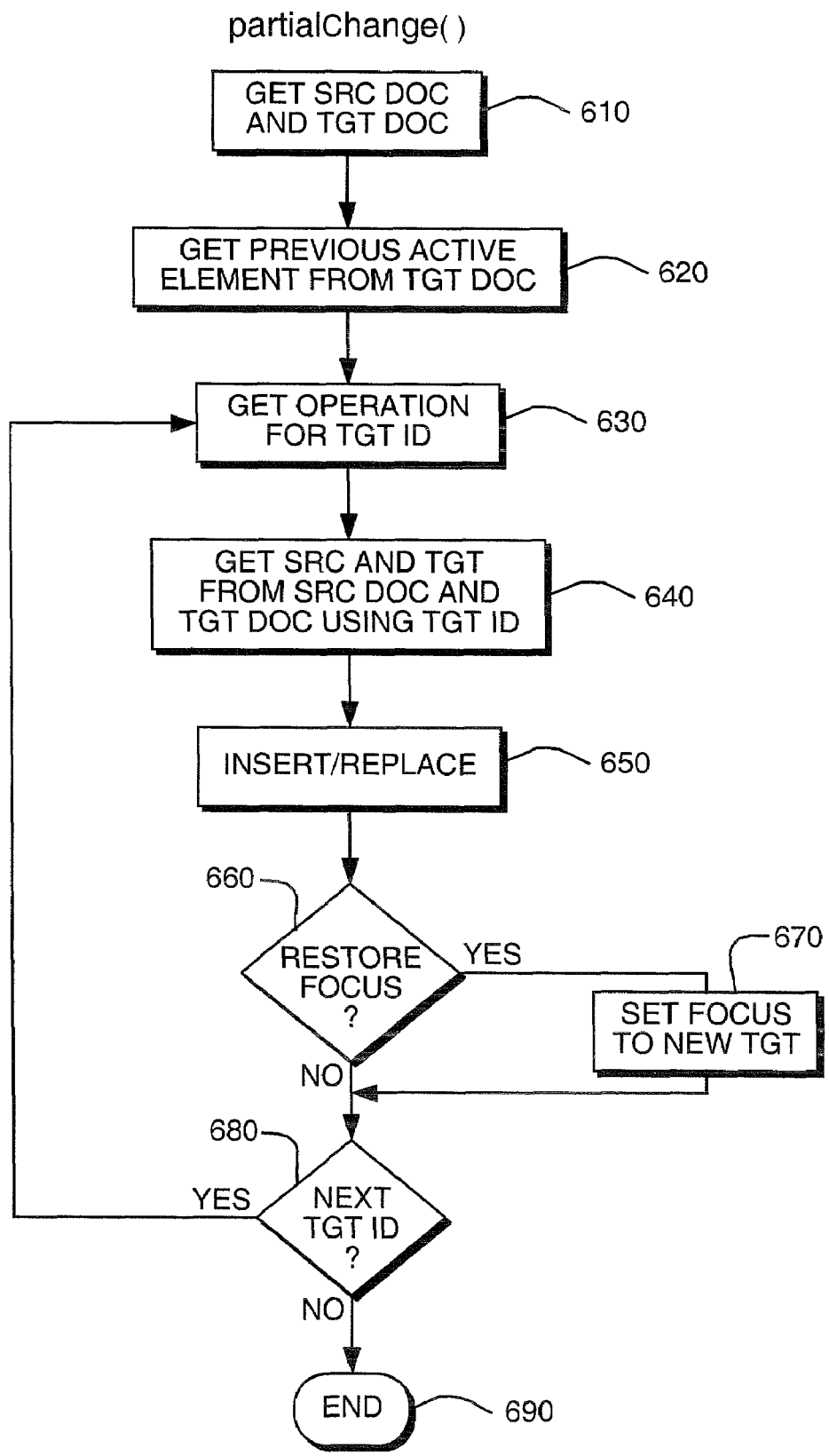
FIG. 8 is a flow diagram of a process implemented by the partialChange( ) function according to one embodiment.

FIG. 8 is a flow diagram of a process implemented by the partialChange( ) function according to one embodiment.

At 610, an address handle to the source document SRC DOC and the target document TGT DOC is obtained. The source document may be an HTML response document generated by the content server and contained by the proxy element, while the target document may be an HTML document currently displayed as page content.

At 620, the active element in the target document TGT DOC is determined. The active element may be an element in page content that currently has focus. If the active element is replaced during the partial page update, focus should be restored to the new content element that replaced the active element.

At 630, the operation (i.e., replace, append, prepend) that should be applied to the page content is determined. According to one embodiment, the operation may be determined from each of the content identifiers that are passed into the partialChange( ) function. For example, a content identifier TGT ID may have a "+" or a "−" concatenated to it, specifying an append operation or a prepend operation, respectively. The default may be a replace operation.

At 640, the content identifier TGT ID is used to locate the source content element SRC from the proxy element and the target content element TGT from the page content. Depending on the specified operation, the source element SRC may either replace the target element TGT or be inserted proximate to the target element TGT. For Microsoft Internet Explorer browsers having versions 5.0 or greater, the Document Object Management (DOM) method, <document.getElementById('TGT ID')> may be called to obtain elements SRC and TGT as DOM nodes. Otherwise, the DOM method <doc.all('TGT ID')> may be utilized.

At 650, the block insertion and/or replacement is initiated. According to one embodiment, partialChange( ) calls the _setOuterHTML( ) function 700 specifying the target document TGT DOC, the target element TGT, the source element SRC, and the operation (i.e., "replace," "append," or "prepend") to be performed. An implementation of the _setOuterHTML( ) function 700 is disclosed with reference to FIGS. 9A-9C.

At 660, the _setOuterHTML( ) function may have replaced the target element TGT in the page content with the source element SRC, resulting in a new target element NEW TGT in the page content. If so, focus should be restored to the new target element NEW TGT at 670 if the previous active element was a descendent of the target element TGT that was replaced.

At 670, focus may restored to the new target element NEW TGT. However, if the new target content NEW TGT is a container that cannot receive focus, the first focusable element contained with the new target element may receive the focus.

At 680, the process repeats itself for the next content identifier provided to the function. Otherwise, the process ends at 690.

Figure 9A:
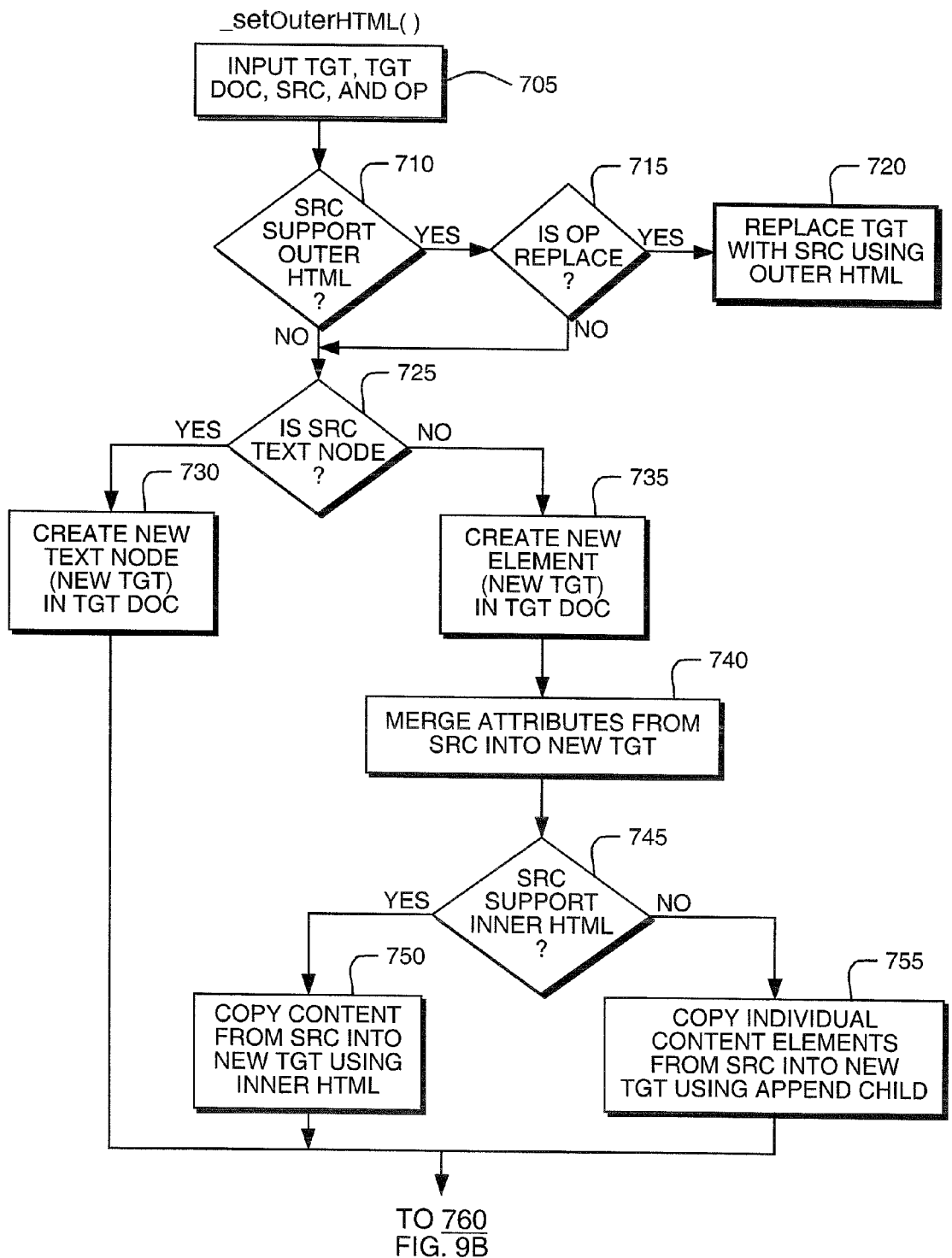
FIGS. 9A and 9B are flow diagrams of a process implemented by the _setOuterHTML( ) function according to one embodiment.
Figure 9B:
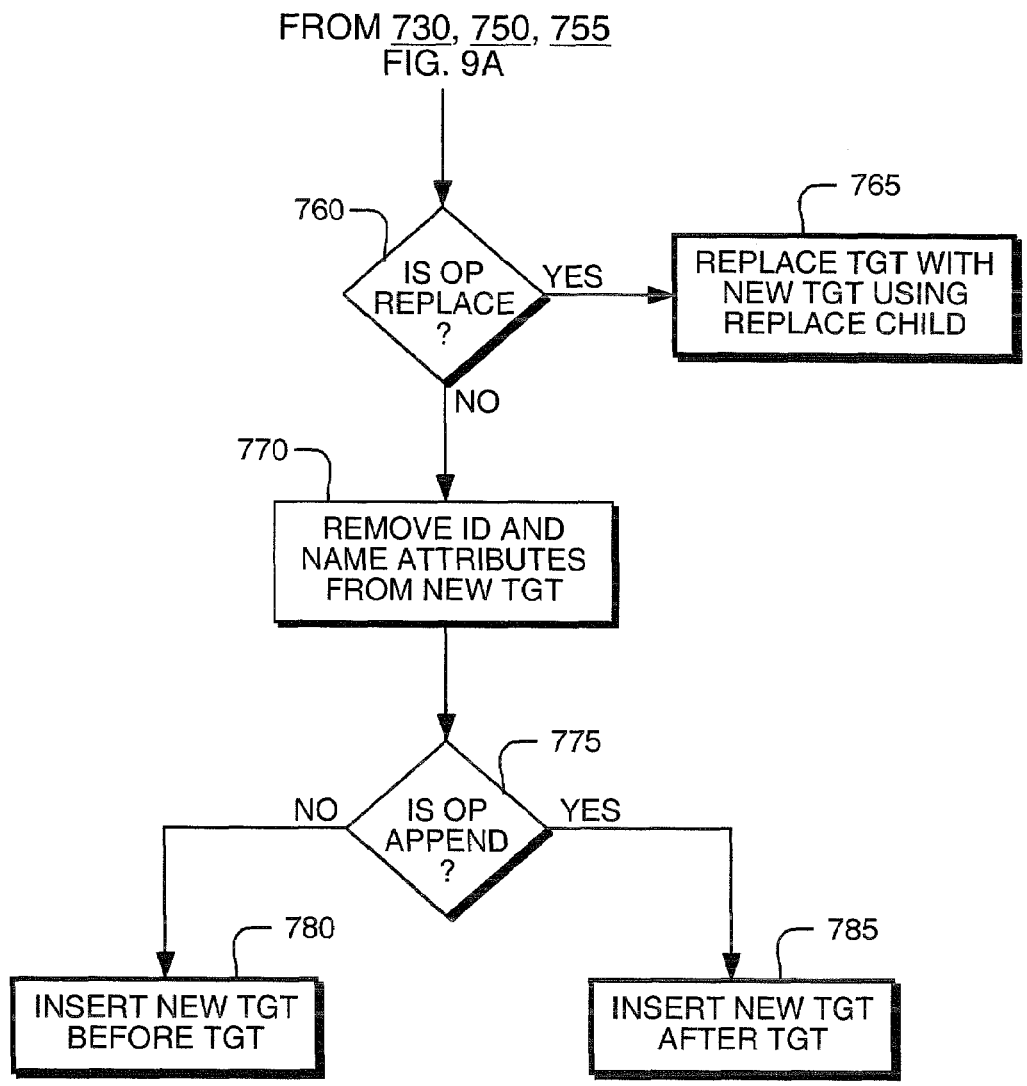

FIGS. 9A and 9B are flow diagrams of a process implemented by the _setOuterHTML( ) function according to one embodiment. The _setOuterHTML( ) function 700 performs block replacement or insertion of content elements. This particular embodiment may be implemented for browsers, such as Microsoft Internet Explorer, that currently do not support the outerHTML property on all content elements.

At 705, the target element TGT, the target document TGT DOC, the source element SRC, and the operation OP are passed as parameters to the _setOuterHTML ( ) function.

At 710, a determination is made as to whether the source element SRC supports the outerHTML property. The property can be any valid string containing a combination of text and tags. When the property is set, the given string completely replaces the object, including its start and end tags. If the string contains HTML tags, the string is parsed and formatted as it is placed into the document.

However, not all HTML elements support this property. For example, TD (table cell), TH (header columns), CAPTION (brief description for table), COL (column-based defaults for the table properties), COLGROUP (property defaults for a column or group of columns in a table), TR (table row), TFOOT (designates row as table's footer), THEAD (designates row as table's header), and TBODY (designates rows as body of table) elements currently do not support the outerHTML property and are processed at 725.

At 715, a determination is made as to whether the operation specifies block replacement for source elements that do support the outerHTML property. If so, the source element SRC may replace the target element TGT at 720 using the outerHTML property. Otherwise, the process proceeds to 725.

The following steps 725 through 755, create an instance of a new target element NEW TGT in the target document TGT DOC in order that DOM functions in steps 760 through 785 may replace the current target element TGT with the new target element NEW TGT or insert the new target element NEW TGT into the page content proximate to the target element TGT.

At 725, a determination is made as to whether the source element SRC is a TextNode object, which represents a string of text as a node in the document hierarchy. If so, the process proceeds to 730 to create a TextNode object in the target document TGT DOC, including the text of the source element. If not, the process proceeds to 735 in order to create an instance of a new element having the same tag name as source element SRC in the target document TGT DOC. The new tag element from 735 or the new TextNode object from 730 is referred herein as the new target element NEW TGT.

At 740, after having creating the new target element NEW TGT at 735, the attributes of the source element SRC are merged into the new tag element NEW TGT. Such attributes may include the NAME and ID attributes. According to one embodiment, the object.mergeAttributes( ) method may be used to copy all read/write attributes to the specified element.

Steps 745 through 755 provide two alternatives for copying the content of the source element SRC into the new target element NEW TGT. In particular, at 745, a determination is made as to whether the source element SRC supports the innerHTML property. If so, the content from the source element SRC may be copied to the new target element NEW TGT using the innerHTML property at 750. Such elements include the TD, TH, and CAPTION elements.

The innerHTML property takes a string that specifies a valid combination of text and elements. When the innerHTML property is set, the given string completely replaces the existing content of the object. If the string contains HTML tags, the string is parsed and formatted as it is placed into the document. If the source element SRC does not support the property, the source element may be a container element containing additional content elements and, thus, the process proceeds to 755.

At 755, content elements of the source element SRC are copied individually into the new target element NEW TGT using the DOM appendChild( ) method, which appends an element as a child to an object. According to one embodiment, this step may be implemented as a recursive call to the _setOuterHTML( ) function 700, in which each successive call adds a new element from the source element SRC to the new target element NEW TGT.

Referring further to FIG. 9B, steps 760 through 785 insert the instance of the new target element NEW TGT (i.e., the new tag element or the new TextNode object) into the page content relative to or in place of the current target element TGT. In particular, at 760, a determination is made as to whether the operation is a block replacement of existing content. If so, the current target element TGT is replaced with the new target element NEW TGT. According to one embodiment, the current target element is replaced using the DOM replaceChild( ) method, which replaces an existing child element (e.g., TGT) with a new child element (e.g., NEW TGT). If the operation does not specify block replacement of content, the process proceeds to 770 to begin a block insertion process.

At 770, the NAME and ID attributes are removed from the new target element to avoid duplicating the same attributes of the current target element.

At 775, a determination is made as to the particular insertion operation to be performed. If the particular insertion operation is a "prepend" operation, the new target element NEW TGT is inserted before the current target element TGT at 780. According to one embodiment, the "prepend" insertion may be implemented using the DOM insertBefore( ) method, which inserts an element (e.g., NEW TGT) into the document hierarchy as a child node of a parent object (e.g., TGT).

If the specified insertion operation is an "append" operation, the process proceeds to 785 at which the new target element NEW TGT is inserted after the current target element TGT. According to one embodiment, the "append" operation may be implemented using DOM according to the _insertAfter( ) function 900 as described with reference to FIG. 10.

Figure 9C:
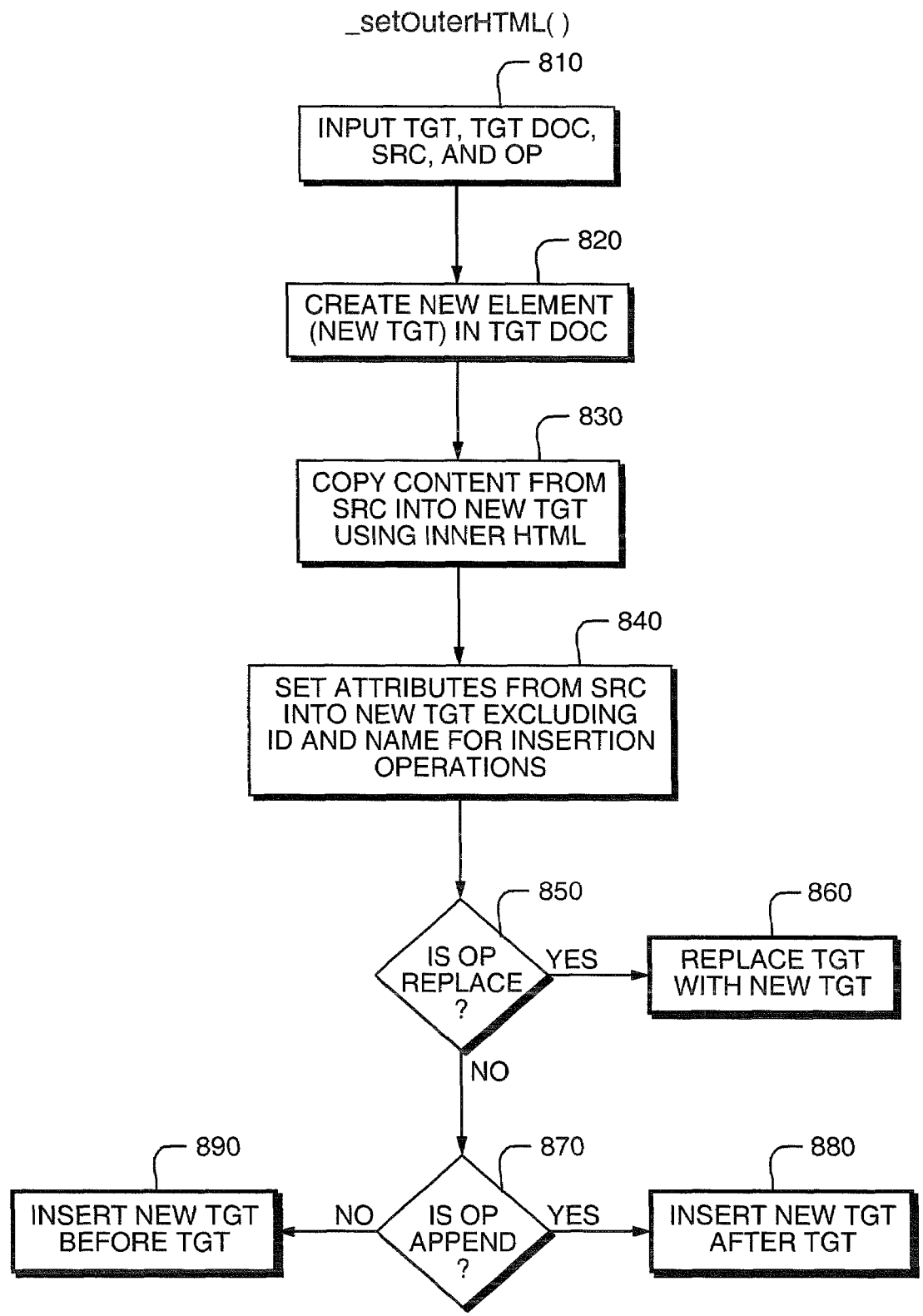
FIG. 9C is a flow diagram of a process implemented by the _setOuterHTML( ) function according to an alternative embodiment.

FIG. 9C is a flow diagram of a process implemented by the _setOuterHTML( ) function according to an alternative embodiment. This particular embodiment may be implemented for browsers, such as Netscape Navigator, that do not support the outerHTML property.

At 810, the target element TGT, the target document TGT DOC, the source element SRC, and the operation OP are passed as parameters to the _setOuterHTML ( ) function.

At 820, an instance of a new element NEW TGT having the same tag name as the source element SRC is created in the target document TGT DOC.

At 830, content from the source element SRC is copied into the new target element NEW TGT using the innerHTML property. The innerHTML property returns all of the markup and content within a given element.

At 840, the attributes from the source element SRC are set to the new target element NEW TGT, excluding the ID and NAME attributes for insertion operations.

At 850, a determination is made as to the particular operation to be performed on the current target element TGT and the new target element NEW TGT. If the specified operation is block replacement, the process proceeds to 860, in which the current target TGT is replaced with the new target element NEW TGT. If not, the process proceeds to 870 for block insertion.

According to one embodiment, block replacement may be implemented by inserting the new target element NEW TGT before the current target element TGT using the DOM insertBefore( ) method and then removing the TGT element with the DOM removeChild( ) method.

At 870, a determination is made as to the particular insertion operation to be performed. If the specified insertion operation is an "append" operation, the new target element NEW TGT is inserted after the current target element TGT at 880. According to one embodiment, the "append" operation may be implemented using DOM according to the _insertAfter( ) function 900 as described with reference to FIG. 10.

At 890, for a "prepend" operation, the new target element NEW TGT is inserted before the current target element TGT at 780. According to one embodiment, the "prepend" insertion may be implemented using the DOM insertBefore( ) method, which inserts a node (e.g., NEW TGT) before a reference element as a child of the current node (e.g., TGT).

Figure 10:
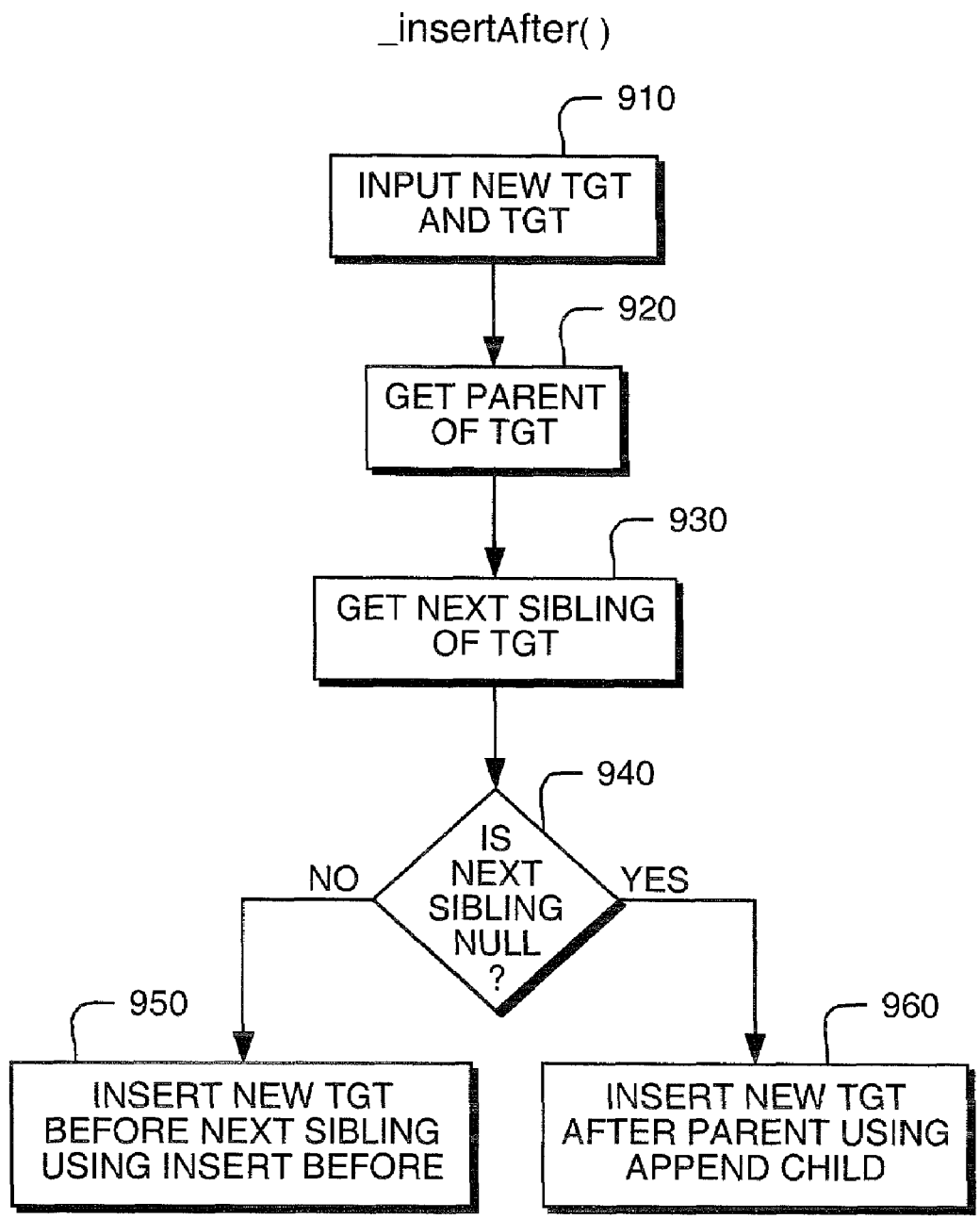
FIG. 10 is a flow diagram of a process implemented by the _insertAfter( ) function according to one embodiment.

FIG. 10 is a flow diagram of a process implemented by the _insertAfter( ) function according to one embodiment. The _insertAfter( ) function 900 performs the block insertion of a new target element into page content proximate to a current target element using DOM.

At 910, the new target element NEW TGT and the current target element TGT are passed as parameters to the _insertAfter( ) function 900.

At 920, the parent node of the current target element is determined. According to one embodiment, the parent node may be determined by referencing the parentNode property of the TGT element.

At 930, the next sibling of the current target element TGT is determined. According to one embodiment, the next sibling may be determined by referencing the DOM nextSibling property of the TGT element. The nextSibling property provides the next node immediately following the current one (e.g., TGT element) in the DOM tree.

At 940, if the next sibling determined at 930 is not null, the process proceeds to 950, inserting the new target element NEW TGT before the next sibling of the TGT element. According to one embodiment, the DOM insertBefore( ) method may be used to perform the insertion. Otherwise, the process proceeds to 960.

At 960, the new target element NEW TGT is inserted after the parent node of the TGT element. According to one embodiment the DOM appendChild( ) method may be used to perform the insertion.

Those of ordinary skill in the art should recognize that methods for a system and method for partial page updates using a proxy element may be embodied in a computer program product that includes a computer usable medium. For example, such a computer usable medium can include a readable memory device, such as a solid state memory device, a hard drive device, a CD-ROM, a DVD-ROM, or a computer diskette, having stored computer readable program code segments.

While the system has been particularly shown and described with references to particular embodiments, it will be understood by those of ordinary skill in the art that various changes in form and details may be made without departing from the scope of the invention encompassed by the appended claims. For example, the methods of the invention can be applied to various environments, and are not limited to the described environment. Furthermore, particular embodiments of the invention may be implemented in conjunction with the Content Update Proxy Method of U.S. application Ser. No. 09/570,276. For instance, similar to embodiments utilizing a proxy element, a proxy frame may implement partial page updates through embodiments of block replacement or insertion. According to another embodiment, a source frame containing methods for updating page content that may be invoked from embodiments of the proxy element.

What is claimed is:

1. A method for updating page content of a web page, comprising:
   communicating page content to a browser from a content server, the page content comprising a proxy content element;
   rendering the page content of the web page in the browser;
   sending a request from the browser to the content server, the request comprising a parameter used by the content server to generate a set of executable instructions; and
   applying a partial page update from the content server to the page content through the proxy content element, the proxy content element comprised within the page content, wherein the applying comprises:
      communicating data for the partial page update from the content server to the proxy content element, wherein the data for the partial page update comprises the set of executable instructions;
      applying the data from the proxy content element to the page content by executing the set of executable instructions to modify a portion of the page content, resulting in a portion of the page content being updated; and
      re-rendering only the data associated with the partial page update in the browser, wherein re-rendering includes:
         reducing page flashing in the browser, wherein a transition from previous page content to updated page content affects less than the entire web page in the browser;
         maintaining scroll position in the browser, wherein the scroll position remains in the same location in the browser during re-rendering of the partial page update; and
         maintaining previously entered data in the browser, wherein the previously entered data is preserved in the web page during re-rendering of the partial page update;
   wherein the method further comprises sending a request to the content server, the request comprising a parameter that identifies a content element of the page content, the parameter being used by the content server to generate the data for the partial page update.

2. The method of claim 1, wherein the data for the partial page update comprises a content element and wherein applying the data from the proxy content element further comprises:
   inserting the content element from the proxy content element into the page content.

3. The method of claim 1, wherein the data for the partial page update comprises a content element and wherein applying the data from the proxy content element further comprises:
   replacing a content element of the page content with the content element from the proxy content element.

4. The method of claim 1, further comprising:
   sending a request to the content server, the request comprising plural parameters that identify plural content elements of the page content, the parameters being used by the content server to generate the data for the partial page update.

5. The method of claim 1, wherein the data for the partial page update comprises a content element and wherein applying the data from the proxy content element further comprises:
   inserting the content element from the proxy content element before or after the content element identified in the request.

6. The method of claim 1, wherein the data for the partial page update comprises a content element and wherein applying the data from the proxy content element further comprises:
   replacing the content element identified in the request with the content element from the proxy content element.

7. A system for updating page content of a web page, comprising:
   a client computer system;
   a content server communicating page content to a browser, the page content comprising a proxy content element, wherein the browser is located on a said client computer system within the system;
   the browser rendering the page content of the web page;
   the browser sending a request to the content server, the request comprising a parameter used by the content server to generate a set of executable instructions; and
   the browser applying a partial page update from the content server to the page content through the proxy content element, the proxy content element comprised within the page content, wherein applying the partial page update further comprises:
      the content server communicating data for the partial page update to the proxy content element, wherein the data for the partial page update comprises the set of executable instructions;
      the browser applying the data from the proxy content element to the page content by the browser executing the set of executable instructions from the proxy content element to modify a portion of the page content, resulting in a portion of the page content being updated; and
      the browser re-rendering only the data associated with the partial page update, wherein re-rendering includes:
         reducing page flashing in the browser, wherein a transition from previous page content to updated page content affects less than the entire web page in the browser;

maintaining scroll position in the browser, wherein the scroll position remains in the same location in the browser during re-rendering of the partial page update; and maintaining previously entered data in the browser, wherein the previously entered data is preserved in the web page during re-rendering of the partial page update;

wherein the system further comprises the browser sending a request to the content server, the request comprising a parameter that identifies a content element of the page content, the parameter being used by the content server to generate the data for the partial page update.

8. The system of claim 7, wherein the data for the partial page update comprises a content element and wherein the browser applying the data from the proxy content element further comprises:

the browser inserting the content element from the proxy content element into the page content.

9. The system of claim 7, wherein the data for the partial page update comprises a content element and wherein the browser applying the data from the proxy content element further comprises:

the browser replacing a content element of the page content with the content element from the proxy content element.

10. The system of claim 7, further comprising:

the browser sending a request to the content server, the request comprising plural parameters that identify plural content elements of the page content, the plural parameters being used by the content server to generate the data for the partial page update.

11. The system of claim 7, wherein the data for the partial page update comprises a content element and wherein the browser applying the data from the proxy content element further comprises:

the browser inserting the content element from the proxy content element before or after the content element identified in the request.

12. The system of claim 7, wherein the data for the partial page update comprises a content element and wherein the browser applying the data from the proxy content element further comprises:

the browser replacing the content element identified in the request with the content element from the proxy content element.

13. A computer program product for updating page content of a web page, the product comprising:

a computer readable storage medium; and a computer program embedded in the computer readable storage medium, the program including computer instructions to:

communicate page content to a browser from a content server, the page content comprising a proxy content element, wherein the browser is located on a client computer system within the system;

render the page content of the web page in the browser;

send a request from the browser to the content server, the request comprising a parameter used by the content server to generate a set of executable instructions; and apply a partial page update from the content server to the page content through the proxy content element, the proxy content element comprised within the page content, wherein the instructions to apply the partial page update comprise further instructions to:

communicate data for the partial page update from the content server to the proxy content element, wherein the data for the partial page update comprises the set of executable instructions;

apply the data from the proxy content element to the page content by executing the set of executable instructions to modify a portion of the page content, resulting in a portion of the page content being updated; and re-render only the data associated with the partial page update in the browser by:

reducing page flashing in the browser, wherein a transition from previous page content to updated page content affects less than the entire web page in the browser;

maintaining scroll position in the browser, wherein the scroll position remains in the same location in the browser during re-rendering of the partial page update; and maintaining previously entered data in the browser, wherein the previously entered data is preserved in the web page during re-rendering of the partial page update;

wherein the computer program product further comprises instructions to send a request to the content server, the request comprising a parameter that identifies a content element of the page content, the parameter being used by the content server to generate the data for the partial page update.

14. The computer program product of claim 13, wherein the data for the partial page update comprises a content element and wherein the instructions to apply the data from the proxy content element comprise further instructions to:

insert the content element from the proxy content element into the page content.

15. The computer program product of claim 13, wherein the data for the partial page update comprises a content element and wherein the instructions to apply the data from the proxy content element comprise further instructions to:

replace a content element of the page content with the content element from the proxy content element.

16. The computer program product of claim 13, further comprising instructions to:

send a request to the content server, the request comprising plural parameters that identify plural content elements of the page content, the parameters being used by the content server to generate the data for the partial page update.

17. The computer program product of claim 13, wherein the data for the partial page update comprises a content element and wherein the instructions to apply the data from the proxy content element comprise further instructions to:

insert the content element from the proxy content element before or after the content element identified in the request.

18. The computer program product of claim 13, wherein the data for the partial page update comprises a content element and wherein the instructions to apply the data from the proxy content element comprise further instructions to:

replace the content element identified in the request with the content element from the proxy content element.

19. A system for updating page content of a web page, comprising:

a client computer system;

a means for rendering the page content of the web page in a browser, wherein the browser is located on a said client computer system within the system;

a means for sending a request from a proxy content element to a content server, the request comprising a parameter used by the content server to generate a set of executable instructions;

a means for communicating data for a partial page update of page content from the content server to the proxy content element; and a means for applying the data for the partial page update to the page content through the proxy content element, resulting in a portion of the page content being updated, the proxy content element comprised within the page content, wherein the means for applying the data for the partial page update comprises:

a means for executing the set of executable instructions from the proxy content element to modify the portion of the page content; and a means for re-rendering only the data associated with the partial page update in the browser, wherein the means for re-rendering includes:

reducing page flashing in the browser, wherein a transition from previous page content to updated page content affects less than the entire web page in the browser;

maintaining scroll position in the browser, wherein the scroll position remains in the same location in the browser during re-rendering of the partial page update; and maintaining previously entered data in the browser, wherein the previously entered data is preserved in the web page during re-rendering of the partial page update;

wherein the system further comprises a means for sending a request to the content server, the request comprising a parameter that identifies a content element of the page content, the parameter being used by the content server to generate the data for the partial page update.

20. The system of claim 19, wherein the means for applying the data for the partial page update comprises:
a means for inserting a source content element from the proxy content element relative to a target content element into the page content.

21. The system of claim 19, wherein the means for applying the data for the partial page update comprises:
a means for replacing a target content element of the page content with a source content element from the proxy content element.

22. A method for updating page content of a web page, comprising:
rendering the page content of the web page in a browser;
sending a request from a proxy content element to a content server, the request comprising a parameter used by the content server to generate a set of executable instructions;
sending a request for an update to page content from the proxy content element to the content server;
communicating data for the update from the content server to the proxy content element; and
applying the data from the proxy content element to the page content such that a portion of the page content is updated, wherein applying the data comprises:
executing the set of instructions to modify a portion of the page content, the portion being less than the page content; and
re-rendering only the data associated with the partial page update in the browser re-rendering only the data associated with the partial page update in the browser, wherein re-rendering includes:

reducing page flashing in the browser, wherein a transition from previous page content to updated page content affects less than the entire web page in the browser;

maintaining scroll position in the browser, wherein the scroll position remains in the same location in the browser during re-rendering of the partial page update; and maintaining previously entered data in the browser, wherein the previously entered data is preserved in the web page during re-rendering of the partial page update;

wherein the method further comprises sending a request to the content server, the request comprising a parameter that identifies a content element of the page content, the parameter being used by the content server to generate the data for the update.

23. The method of claim 22, wherein the proxy content element is an IFrame element.

24. The method of claim 22, wherein the proxy content element is a layer element.

25. The method of claim 22, wherein applying the data comprises:
locating a target content element in the page content;
locating a source content element in the proxy content element;
replacing the target content element in the page content with content from the source content element; and
rendering a portion of the page content that was replaced.

26. The method of claim 22, wherein applying the data comprises:
locating a target content element in the page content;
locating a source content element in the proxy content element;
inserting the source content element relative to the target content element in the page content; and
rendering a portion of the page content that was inserted.

27. A system for updating page content of a web page, comprising:
a client computer system;
a browser rendering the page content of the web page, wherein the browser is located on a said client computer system within the system;
the browser sending a request from a proxy content element to a content server, the request comprising a parameter used by the content server to generate a set of executable instructions;
the browser sending a request for an update to page content from the proxy content element to the content server;
the content server communicating data for the update to the proxy content element; and
the browser applying the data from the proxy content element to the page content such that a portion of the page content is updated, the proxy content element comprised within the page content, wherein applying comprises:
communicating data for the partial page update from the content server to the proxy content element, wherein the data for the partial page update comprises the set of executable instructions;
applying the data from the proxy content element to the page content by executing the set of executable instructions to modify a portion of the page content, resulting in a portion of the page content being updated; and the browser re-rendering only the data associated with the partial page update re-rendering only the data associated with the partial page update in the browser, wherein re-rendering includes:
  reducing page flashing in the browser, wherein a transition from previous page content to updated page content affects less than the entire web page in the browser;
  maintaining scroll position in the browser, wherein the scroll position remains in the same location in the browser during re-rendering of the partial page update; and
  maintaining previously entered data in the browser, wherein the previously entered data is preserved in the web page during re-rendering of the partial page update;
wherein the system further comprises the browser sending a request to the content server, the request comprising a parameter that identifies a content element of the page content, the parameter being used by the content server to generate the data for the partial page update.

28. A computer program product for updating page content of a web page, the product comprising:
  a computer readable storage medium; and
  a client computer system;
  a computer program embedded in the computer readable storage medium, the program including computer instructions to:
render the page content of the web page in a browser, wherein the browser is located on a said client computer system within the system;
  send a request from a proxy content element to a content server, the request comprising a parameter used by the content server to generate a set of executable instructions;
  send a request for an update to page content from the proxy content element to the content server;
  communicate data for the update from the content server to the proxy content element; and
  apply the data from the proxy content element to the page content such that a portion of the page content is updated, the proxy content element comprised within the page content, wherein applying comprises:
    communicating data for the partial page update from the content server to the proxy content element, wherein the data for the partial page update comprises the set of executable instructions;
    applying the data from the proxy content element to the page content by executing the set of executable instructions to modify a portion of the page content, resulting in a portion of the page content being updated; and
    re-render only the data associated with the partial page update in the browser re-rendering only the data associated with the partial page update in the browser, wherein re-rendering includes:
      reducing page flashing in the browser, wherein a transition from previous page content to updated page content affects less than the entire web page in the browser;
      maintaining scroll position in the browser, wherein the scroll position remains in the same location in the browser during re-rendering of the partial page update; and
      maintaining previously entered data in the browser, wherein the previously entered data is preserved in the web page during re-rendering of the partial page update;
wherein the computer program product further comprises instructions to send a request to the content server, the request comprising a parameter that identifies a content element of the page content, the parameter being used by the content server to generate the data for the partial page update.

29. The method of claim 1 comprising:
  generating, at the proxy content element, a request for the partial page update;
and wherein sending comprises:
  sending the request from the proxy content element to the content server, the request comprising a parameter that identifies a content element of the page content, the parameter being used by the content server to generate the data for the partial page update.

30. The system of claim 7 comprising:
  the browser sending a request for the partial page update from the proxy content element to the content server, wherein the request is generated at the proxy content element, the request comprising a parameter that identifies a content element of the page content, the parameter being used by the content server to generate the data for the partial page update.

31. The computer program product of claim 13 comprising instructions to:
  generate, at the proxy content element, a request for the partial page update;
and wherein instructions to send comprise instructions to:
  send the request from the proxy content element to the content server, the request comprising a parameter that identifies a content element of the page content, the parameter being used by the content server to generate the data for the partial page update.

32. The method of claim 1, wherein the applying a partial page update from the content server to the page content through the proxy content element, the page is updated when a new content element identifier matches a current content element identifier.

* * * * *

UNITED STATES PATENT AND TRADEMARK OFFICE
CERTIFICATE OF CORRECTION

| | | |
|---|---|---|
| PATENT NO. | : 7,523,158 B1 | Page 1 of 1 |
| APPLICATION NO. | : 10/246661 | |
| DATED | : April 21, 2009 | |
| INVENTOR(S) | : Nickerson et al. | |

It is certified that error appears in the above-identified patent and that said Letters Patent is hereby corrected as shown below:

In column 8, line 34, delete "on Load" and insert -- onLoad --, therefor.

In column 18, line 24, in claim 24, delete "layer" and insert -- Layer --, therefor.

Signed and Sealed this

Twenty-fifth Day of May, 2010

David J. Kappos
*Director of the United States Patent and Trademark Office*